United States Patent [19]

Levy

[11] Patent Number: 5,603,189
[45] Date of Patent: Feb. 18, 1997

[54] COMBINED DWELLING, MARINE HABITAT, AND EDUCATIONAL BUILDING COMPLEX

[76] Inventor: Jacques S. Levy, Avenida Galaverry 2650, San Isidro, Lima 27, Peru

[21] Appl. No.: 595,389

[22] Filed: Feb. 1, 1996

[51] Int. Cl.⁶ ............................ E02D 27/00; B63B 35/00
[52] U.S. Cl. ...................... 52/169.1; 52/236.2; 119/245
[58] Field of Search ............................ 52/234, 236.1, 52/236.2, 236.3, 169.2, 169.1, 169.3, 169.4, 169.7, 169.8; 119/245, 248, 251, 269

[56] References Cited

U.S. PATENT DOCUMENTS

| | | |
|---|---|---|
| 739,961 | 1/1903 | Weisker . |
| 1,572,463 | 2/1926 | Bintz . |
| 2,698,973 | 1/1955 | Zenkendorf et al. ................ 52/234 X |
| 3,179,084 | 4/1965 | Norris et al. ............................ 119/269 |
| 3,378,963 | 4/1968 | Obata .................................... 52/234 X |
| 3,708,991 | 1/1973 | Barkley . |
| 3,791,080 | 2/1974 | Sjoberg . |
| 3,895,495 | 7/1975 | Akazaki et al. . |
| 3,986,306 | 10/1976 | Trannoy ............................... 52/234 X |
| 4,186,532 | 2/1980 | Kahn . |
| 4,434,595 | 3/1984 | de Bradant ............................. 52/236.2 |
| 4,837,989 | 6/1989 | Levy . |
| 4,904,118 | 2/1990 | Thiemann, III . |
| 4,905,326 | 3/1990 | Nakamura et al. . |
| 4,958,465 | 10/1990 | Levy . |

FOREIGN PATENT DOCUMENTS

| | | |
|---|---|---|
| 1-263365 | 4/1988 | Japan . |
| 3-293480 | 4/1990 | Japan . |

*Primary Examiner*—Lanna Mai
*Attorney, Agent, or Firm*—Richard C. Litman

[57] ABSTRACT

An on-shore building construction, having two distinctive divisions each in combination with an adjacent containment of water. A first division includes a plurality of separate living or other type units and a second division includes display halls or other public rooms intended for use with museum-quality exhibits. Each division is arranged in combination with the water containment structure whereby public visitors may enter the second division and be provided access to view the marine life residing within the water containment structure and explore the exhibits and displays of the second division, while occupants of the first division are provided with the ultimate in close association with the marine life residing within the water containment structure without the inconvenience of traffic flow of public visitors. The living units are arranged in a manner relative to the display halls so as to allow separate access by occupants and public visitors to minimize disturbance of the second division.

2 Claims, 2 Drawing Sheets

COMBINED DWELLING, MARINE HABITAT, AND EDUCATIONAL BUILDING COMPLEX

BACKGROUND OF THE INVENTION

1. Field of the Invention

The present invention relates generally to the construction of buildings, and more particularly, to a combination of multi-unit living or other areas in conjunction with both an educational facility and a relatively large body of contained water adapted to provide habitat for marine life.

2. Description of the Prior Art

The popularity of observatories or aquariums for the display of living aquatic animals is well recognized; likewise, scientific and cultural interpretive displays, such as found in museums worldwide, enhance a visitor's enjoyment of and education regarding the exhibited subject matter, often local or regional in nature. Numerous facilities have been constructed to provide a public display of marine life and interpretive informational displays, such as the open-air, tank installations in the state of Florida and the various enclosed aquariums. Moreover, the popularity with tourists of the culture and science of a geographic region to which they have travelled invites the concept of combining informational interpretive displays, living exhibits such as an aquatic animal display, and dwelling units to provide a comprehensive building complex for introduction of the region's attractions to the tourist.

Various inventions may be found applied to narrow fields in the prior art; but, each fails to provide a comprehensive approach to the education, enjoyment and comfort of a visitor. For example, submerged off-shore facilities have been provided which allow visitors to observe marine life, both as contained in tanks therein as well as in the surrounding sea water. Examples of such structures include U.S. Pat. No. 4,186,532 issued Feb. 5, 1980 to Kahn; U.S. Pat. No. 739,961 issued Sep. 29, 1903 to Weisker; and, U.S. Pat. No. 4,904,118 issued Feb. 27, 1990 to Thiemann, III. Pool facilities intended for recreational scuba diving and simulative seaside bathing are also known; exemplary patents describing such structures include U.S. Pat. No. 1,572,463 issued Feb. 9, 1926 and U.S. Pat. No. 4,905,326 issued Mar. 6, 1990 to Tasuro Nakamura (also published in Japanese publication No. 1-263365 dated Oct. 19, 1989). Floating facilities are also provided in the prior art, showing a broad range of applications. U.S. Pat. No. 3,791,080 issued Feb. 12, 1974 to Sjoberg describes a floating or land based modular assembly for housing; U.S. Pat. No. 3,708,991 issued Jan. 9, 1973 to Barkley describes a buoyant submarine home; U.S. Pat. No. 3,895,495 issued Jul. 22, 1975 to Akazaki et al. describes an pleasure boat for observation of underwater and sea-bottom ecology; Japanese published application No. 3-293480 dated Apr. 10, 1990 by Hida describes a domed floating facility having direct access to seawater for scuba diving training.

Finally, U.S. Pat. No. 4,837,989 issued Jun. 13, 1989 and U.S. Pat. No. 4,958,465 issued Sep. 25, 1990, both to the present inventor, Jacques S. Levy, describe a marine habitat combined with an above and below grade dwelling. The building installation includes a multi-level development with several stacked levels each offering a plurality of adjacent units suitable as residential units or the like. A centrally located excavation for a water containment structure is adapted to provide a habitat for marine life. Windows in the wall of at least one level juxtaposed with the water containment structure permit direct observation of the marine life; walkways and stairways exteriorly of both sides of the building levels allow ready movement of occupants between all levels.

The present invention offers improvements over the above mentioned public facilities and those disclosed in my earlier U.S. Pat. No. 4,837,989 issued Jun. 13, 1989 and U.S. Pat. No. 4,958,465 issued Sep. 25, 1990. None of the above inventions and patents, taken either singly or in combination, is seen to describe the instant invention as claimed.

SUMMARY OF THE INVENTION

The present invention provides an on-shore building construction, having two distinctive divisions each in combination with an adjacent containment of water. A first division includes a plurality of separate living or other type units and a second division includes display halls or other public rooms intended for use with museum-quality exhibits. Each division is arranged in a unique manner in combination with the water containment structure, whereby public visitors may enter the second division and be provided access to view the marine life residing within the water containment structure and explore the exhibits and displays of the second division, while occupants of the first division are provided with the ultimate in close association with the marine life residing within the water containment structure without the inconvenience of traffic flow of public visitors. The living units are arranged in a manner relative to the display halls so as to allow separate access by occupants and public visitors to minimize disturbance of the first division.

Accordingly, it is a principal object of the invention to provide a combined dwelling and educational complex with marine habitat, including a building substantially surrounding the marine habitat and including a substantially residential, office or recreational building having a plurality of separate units disposed on multiple horizontal or vertical levels, with an adjacent, centrally disposed containment of water provided with resident marine life.

It is another object of the invention to provide a combined dwelling and educational complex with marine habitat, including a building including a plurality of separate living quarters of other units located on multiple vertical or horizontal levels adjacent a containment of water having marine life therein which is distinct and separated from the educational division in a manner relative to the marine habitat so as to limit access by public visitors to the residential division but so as to not limit access by public visitors to view the marine habitat.

It is a further object of the invention to provide a combined dwelling and educational complex with marine habitat, including a building wherein an office or recreational building having a plurality of separate units disposed on multiple horizontal or vertical levels, is juxtaposed with an adjacent, centrally disposed containment of water provided with resident marine life, which complex substantially encompasses the water containment structure.

Still another object of the invention is to provide a combined dwelling and educational complex with marine habitat including a plurality of units on multiple levels and wherein a water containment structure housing marine life is immediately juxtaposed with at least one such level of each the residential dwelling division and the educational division, with direct visual and body access to the water being provided to users of the installation.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
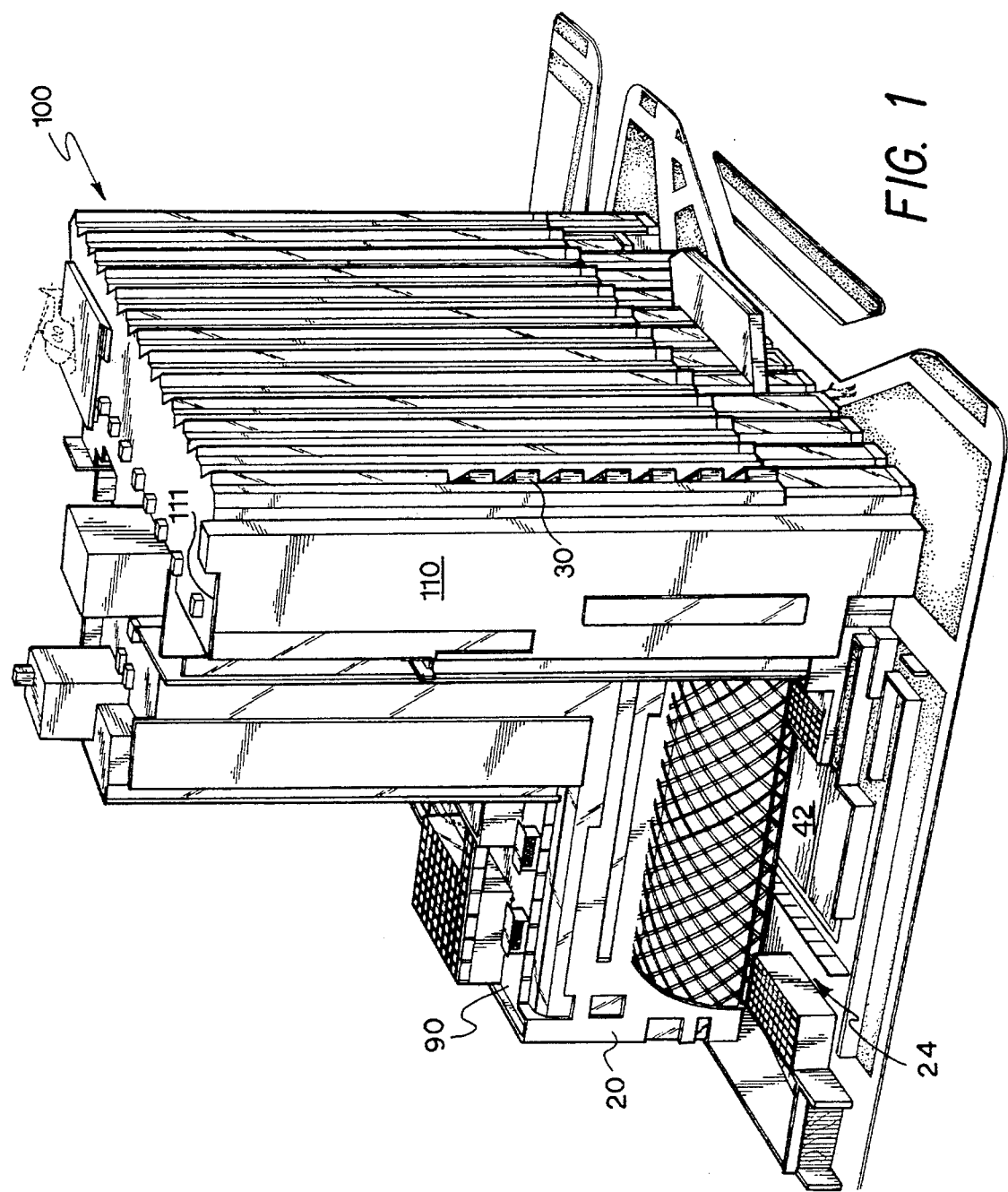
FIG. 1 is a perspective view of a typical of a preferred embodiment of the combined dwelling, marine habitat and educational complex.
Figure 2:
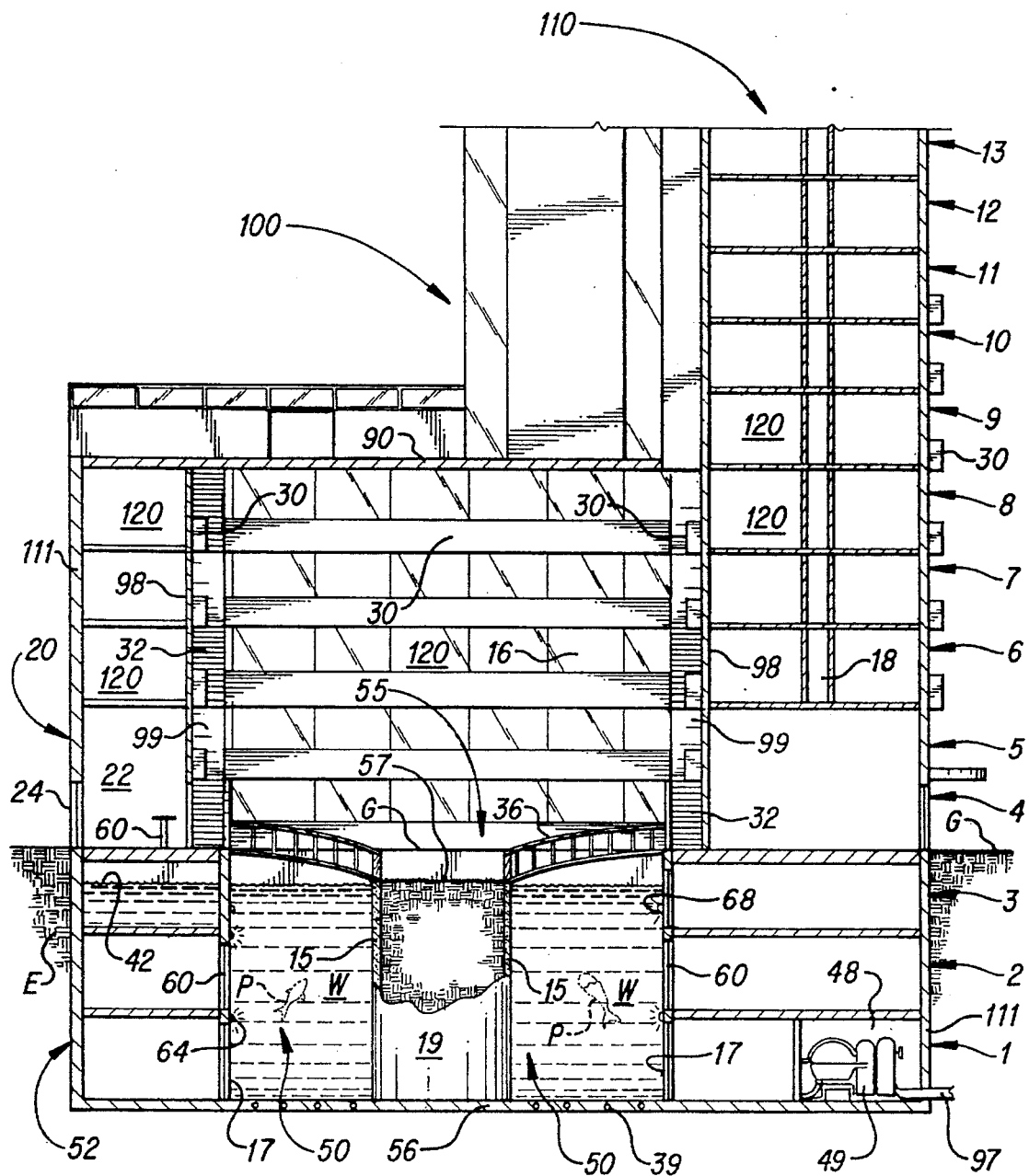
FIG. 2 is a vertical sectional view of a typical installation of the type as shown in FIG. 1.

The present invention relates generally to the construction of buildings, and more particularly, to a combination of multi-unit living or other areas in conjunction with both an educational facility and a relatively large body of contained water adapted to provide habitat for marine life. The drawings in FIGS. 1 and 2 show representative views of a building complex which is typical of the combined dwelling, marine habitat and educational complex; specific figures will hereinafter be referred to only to highlight certain features, if necessary.

The present invention provides an on-shore building complex 100, having two distinctive divisions 110,20, each in combination with an adjacent water containment structure 50. A first division 110 includes a plurality of separate living or other type units 120 and a second division 20 includes display halls 22 or other public rooms intended for use with museum-quality exhibits. The water containment structure 50 is surrounded by both divisions 110,20 and is centrally arranged between both divisions 110,20 whereby separate access to the water containment structure 50 is provided for public visitors of the second division 20 and for occupants of the first division 110. Visitors must enter the second division 20 by means of a separate entrance 24 to view the marine life residing within the water containment structure and museum exhibits. Occupants of the first division 110 are provided the additional benefits of direct access to the water containment structure 50 from the living units 120 as well as a private and separate accessway 14 to the second division 20, whereby disturbance of the first division 110 is minimized. Thus, occupants can enjoy the ultimate in close association with the marine life residing within the water containment structure and have free access to scientific and informational displays found primarily in the second division without the inconvenience of a traffic flow of public visitors through the first division.

The complex 100 provides co-habitation between occupants of the first division 110 (being substantially a multi-unit housing structure) and the immediately adjacent water containment structure 50. The housing structure 110 comprises a plurality of levels or stories (shown as levels 1–13 in FIG. 2) preferably forming an endless or continuous arrangement to encompass the water containment structure 50; such an encompassing polygonal configuration is shown in FIG. 2 in which the second division 20, being a museum, partially interrupts the housing structure 110 so that access to the water containment structure 50 is possible.

The complex 100 is erected within an excavation 52 formed within the earth E. This excavation 52 extends below grade or ground level G a sufficient depth to allow for the erection of one or more of the housing levels. FIG. 2 shows levels 4–13 erected above grade, whereas levels 1–3 are disposed below grade; but, it will be apparent that an alternate number of stories may be erected above or below ground, respectively. For example, the lower most level may be constructed directly at grade level.

Referring to the second division 20, or museum, the display halls 22 are erected both above grade and within the excavation 52 within the earth E in a similar manner as described above. The area over a single level which the display halls 22 cover may typically be as much as 10,000 square feet, this area being divided into relatively few polygonally configured rooms and connected by open passages to maintain the open and expansive appearance of a museum for display and storage of exhibits and displays. These halls 22 may have ceilings of substantial height, for larger displays and display cases, which height may rise to utilize the vertical height of two or more levels, as shown comprising both level 4 and level 5 in FIG. 2. However, it should be noted that to maximize residential housing, the display halls 22 may be disposed on lower levels, such as 1,2 with housing units 120 residing in levels above the display halls 22. The museum 20 itself is seen to comprise a plurality of levels or stories 1–4 preferably completing an endless or continuous arrangement with the housing structure 110 to entirely encompass the water containment structure 50.

The excavation 52 is formed within an outside wall 111 positioned between the ground and an inner wall 15. The inner wall 15, being the most inwardly wall of the excavation 52, is spaced inwardly of an inside wall 17, being the inwardly positioned wall forming the configuration of the display halls 22 and living units 120. The outside wall 111 is also the outwardly positioned wall forming the configuration of the display halls 22 and living units 120. A plurality of wells 99 above and below grade are provided for placement of access means 32 to and from living units 120 and above grade access to and from the display halls 22 facing the marine habitat. The well 99 is be formed by a well wall 98 placed between the inside wall 17 and the outside wall 111 to connect each of the levels.

This configuration provides a central, relatively enlarged excavated area 55 immediately adjacent and between the building inside walls 17 of either the display halls 22 or living units 120 and the inner walls 15 forming an island 19. These walls and a floor 56 of the excavation 52 will be seen to substantially comprise the below grade portion of the water containment structure 50, the first division 110, and the second division 20.

As an alternative, regardless of the configuration of the museum 20 and housing structure 110, it will be appreciated that the water containment structure 50 may be constructed so as to position it at any one or more other levels, besides those shown in the drawing.

The island 19, which may be provided within the confines of the excavation inner walls 15, which may assume any configuration. The top or upper surface 57 of any such island may be disposed at various elevations. As shown in the drawing, this surface 57 is located substantially at the level of grade G but may be formed above or even farther below grade as desired. Quite obviously, if it is desired to omit the inclusion of the central-most island 19, the excavation 52 would extend, as a coextensive area, from the building inside wall 17 to opposing inside wall 17.

Each level 1–13 of the housing structure 110 includes a plurality of adjacent, individual dwelling units 120, each of which may comprise a self-contained family unit or living quarters having any desired number of rooms which may be alternatively configured, or alternatively, office space or recreation rooms, etc. The term family unit is to be construed to refer to any desired residential or office enclosure, suitably configured interiorly as desired. Additionally, each unit 120 may fully extend between the outside and inside walls 111,17 or may comprise radially adjacent units. In the former instance, each unit 120 may have access from either building wall 111,17 by means of an appropriate door 16 (such as a glass slider) leading to the walkway 30, or in the latter instance by an appropriate door (not shown) accessible from a central corridor 18.

Each of the building levels may be provided with an external balcony or walkway 30. Balconies or walkways 30 are provided on the outside and inside wall 111,17; if positioned above the museum 20, the balconies 30 are obviously above the level of the museum 20. Balconies or walkways 30 which are associated with the housing structure 110 are provided on the inside wall 111,17 above the level of the water containment structure 50, upwardly.

To offer access between various ones of the levels 1–13 as well as the ground level G, a plurality of stairway assemblies 32 are provided adjacent the building inside wall 17 with individual flights providing communication between each vertically adjacent building walkway 30. The stairway assemblies may be equi-spaced about the periphery of the building and may comprise any desired number of stairways so as to provide ease of movement by the occupants, between their respective family unit 120 and the adjacent ground level G. The wells 99 may accommodate other access means 32 such as elevators if desired. A plurality of inside stairways similarly connect the vertically adjacent central corridor 18 of the housing structure 110. This latter access means or stairways may be aligned with the previously described inside stairways 32 and communicate therewith by means of passageways, each disposed between selected adjacent family units 120 on those levels 4–13 located above grade level.

Included among the passageways is at least one controlled accessway 14 to the museum 20, which may be provided at ground level G as shown in FIG. 2, or by means of an additional inside well 99 and stairway to the museum 20 from any housing structure level adjacent to the museum 20. A control means 60 for the accessway 14 is provided which may be chosen from any of the known means of control, including a mechanically operated turnstile 60 or simply a human guard.

With the foregoing in mind, it will be seen that occupants of the housing structure 110 are provided with ready access to and from their respective family unit 120, and the museum 20 and ground level for access to the marine habitat.

The excavated area between the island 19 and the inside wall 17 is intended to retain water W to provide the containment serving as a marine habitat for aquatic animals, such as dolphins or porpoises. In instances wherein the island 19 is omitted, the body of water would obviously extend fully within the confines as defined by the building inside wall 17. The outer boundary of this water body will be understood to be provided by an adequately reinforced building inside wall 17, while an appropriate structural base is disposed upon the excavation floor 56 and the vertical wall of the island 19. Quite obviously that portion of the inside wall 17 located below grade G will be constructed of suitable strength to adequately withstand water pressure of the water W within the water containment structure 50.

To enable occupants of the lower levels 1,2, as well as visitors to the museum 20, to closely observe the marine life P residing in the water W, at least one window 60 is provided within the inside wall 17 of the family unit 120 and the display hall 22 in the lower levels 1,2. With this construction a most intimate relationship is established between occupants of the units and marine life juxtaposed with one another in the lower levels 1,2.

Although occupants of the above grade units in levels 4–13 do not have the benefit of the direct, below water-level communication by way of the windows 60 disposed below water level 41, they may view the marine life from the windows 16 (or glass slider door) in the inside wall of the upper levels, from the walkways 30 overlooking the water W, or visit the museum 20 for a below water-level interaction of a more limited duration. If the water containment structure 50 is disposed at one of the upper levels 4–13, then, of course, the special windows 60 necessary for an underwater installation would be incorporated at the level adjacent the containment structure 50.

As noted previously, access of the water containment structure 50 is provided to public visitors of the museum 20 by means of a separate entrance 24 so that access to view the marine life residing within the water containment structure, as well as exhibits displayed in the display halls 22, is provided. Disturbance of the housing structure 110 otherwise caused by the traffic flow of the public is thus minimized without unduly limiting the ultimate in close association with the marine life residing within the water containment structure to either the public or non-occupants of the family units 120 having direct windows 60 into the containment structure 50.

The close relationship between the occupants or visitors and the marine life is further enhanced by the provision of underwater microphones 64 and which may be mounted upon any of the surfaces containing the water W, such as the inside walls 17. The microphones are connected to a speaker (not shown) located within each of the living units 120 and regulated by suitable switch/volume means (not shown) so that any occupant may selectively listen to the distinctive sounds made by the marine life P within the water. To enable around the clock appreciation of the marine life, appropriate underwater lighting units 68 are also provided. The structural island wall may be painted or otherwise adorned with any desirable pictorial scenes such as, aquatic plant life, coral, etc.

Likewise, the museum 20 may contain any displays of interest, preferably ones relating to local or regional attractions. The displays may also relate to the scientific interests regarding the marine life found in the water containment structure 50, as well as, the cultural, anthropological, geographic, geological or other scientific interests relating to region. In short, the displays and exhibits should interact with the local and regional attractions such that the occupant of the housing structure 110 is introduced to the attractions of the area without the need initially to venture away from the complex 100. As such, the housing structure 110 may be decorated and provided with appropriately coordinated informative displays to reflect a unified theme throughout both the housing structure 110 and the museum 20.

Occupants of the housing structure 110 may readily utilize the top surface 57 of the island 19, when present, for various recreational purposes such as sun bathing, picnicking, etc., and access thereto may be provided by one or more crossovers or bridges 36 extending from the lowermost one of the inside walkways 30, to the island top surface 40. None of the bridges are connected with passages leading directly to the outside of the housing structure 110. In this manner, public visitor traffic to the island can be limited. It will be understood that the inclusion of the island is not necessary but may be included as a possible refinement, since the water lever 41 may be disposed adjacent any one of the housing structure levels and thereby provide direct access to the water W.

Maintenance of the proper physical and chemical conditions of the water W is assured by providing appropriate support equipment 49 within one or more service rooms 48, preferably located in the lowermost level. For example, the temperature of the water W may be regulated through conduits 39 embedded within the structural base 56 and which may be supplied with temperature-regulated air or liquid as delivered from the equipment 49, the latter of which may be operated by electricity, gas or fuel oil. Other equipment within the service room 48 will be understood to maintain the purity or cleanliness of the water and may include well known devices such as filters and automatic testing devices.

When the installation 100 is constructed in the vicinity of a natural body of sea water, it is proposed that a suitable pipeline 97 will lead from the service room 48 to the sea water. In such cases, the maintenance of the proper salinity in the water W may be readily achieved by periodically cycling into the containment structure 50 measured volumes of fresh sea water as drawn through the pipeline 97. The equipment 49 includes a reversible pump so that water may be directed into as well as out of the containment structure 50. This allows maintenance of the water level 41 at the desired point and permits draining and re-supply of the water. The pipeline 97 may be utilized thusly, both as a supply pipe as well as a drain line.

Should any servicing of the walls forming the water containment structure 50 be required, or if one or more specimens of the marine life P need special medical or other attention, means must be provided to conveniently hold the aquatic animal in an alternate location, with minimal disruption. Accordingly, a holding tank 42 is provided in the level 3 adjacent to the containment structure 50. Such tank occupies the space within the confines of the museum outside and inside walls 111,17 and includes closure means such as a displaceable door or gate (not shown) in the area of inside wall 17. With this construction, water will be seen to also flow and substantially fill the holding tank 42 and when it becomes necessary to place any of the marine life therein, the door or gate will be opened and the aquatic animal herded therein. If the intent is to isolate one or more specimens of marine life within the holding tank 42, then water W from the containment structure 50 is allowed to continue to commingle with that within the tank 42 in order to maintain consistent physical and chemical parameters of the water. On the other hand, if the containment structure 50 is to be drained, then the door would obviously be sealed in a water-tight manner. In this regard, it will be appreciated that the same mechanical equipment 48 servicing the containment structure 50 will also be utilized to service water as retained in the holding tank 42.

To minimize the variations in the temperature and salinity of the water W and to provide a stabilized environment for residents between the bounds of the housing structure inside wall 17, a roof 90 is provided and which fully spans the open space between opposing inside walls 17.

It is to be understood that the present invention is not limited to the sole embodiment described above, but encompasses any and all embodiments within the scope of the following claims.

I claim:

1. An on-shore educational building complex for the co-habitation of humans and marine life and exhibition of scientific and cultural information, comprising:

a first division for residential dwelling, further comprising a housing assembly including a plurality of vertically or horizontally stacked levels having an inside wall and an outside wall, each said level provided with a plurality of adjacently connected individual units at least some of which comprise independent living quarters, one or more said levels defining lowermost levels and disposed within an excavation below ground level, one or more other ones of said levels defining uppermost levels disposed above ground level, a plurality of walkways exteriorly disposed of said housing assembly inside walls, doors in said housing assembly walls providing communication between said units and said walkways;

access means for movement of humans connecting to all said walkways above and below ground level and accessible from ground level;

at least one passage disposed between adjacent ones of said units and extending between said access means and said inside walls;

a second division for display of informational exhibits, further comprising at least one level of a plurality of display halls, said level having an inside wall and an outside wall, each of said plurality of display halls confined within said inside wall and said outside wall and adjacently connected by a passageway to at least one other of said plurality of halls, one or more said at least one level defining a lowermost level disposed within an excavation below ground level, one or more other ones of said at least one level each defining an uppermost level disposed above ground level, a first accessway disposed in said outside wall for use by public visitors, a partition wall, separating said first division from said second division;

a second accessway disposed in said partition wall for use by occupants of said first division, said second accessway being controlled by a control means for exclusive entry and exit by occupants of said first division and connecting said second division to at least one of said access means of said first division;

access means for movement of humans connecting to all said second division levels above and below ground level and accessible from ground level; and, a water containment structure juxtaposed with said first division and said second division, wherein said water containment structure is juxtaposed with said housing assembly inside wall laterally adjacent at least one of said levels disposed below ground level and further juxtaposed with said second division inside wall laterally adjacent at least one of said display halls disposed below ground level;

windows in said housing assembly inside wall adapted to allow occupants within said units in at least one of said levels below ground level to view at their level into water within said containment, and said access means permitting occupants of the housing assembly to have direct entry into water within said containment;

whereby a building complex having a substantially residential component and an exhibition component intended for public display of regional or local scientific and cultural information is provided, both being juxtaposed with a single water containment structure.

2. The complex according to claim 1, including:

a roof extending from said inside wall of said complex and overlaying said water containment structure.

* * * * *